United States Patent
Andrews

[15] 3,703,714
[45] Nov. 21, 1972

[54] REMOTE ALARM SYSTEM

[72] Inventor: Maurice Andrews, 2400 Johnson Avenue, Riverdale, N.Y. 10463

[22] Filed: Aug. 17, 1970

[21] Appl. No.: 64,232

[52] U.S. Cl. ............................340/224, 325/16, 325/117, 340/63, 340/64, 343/225, 343/227
[51] Int. Cl. ...............................................H04b 7/00
[58] Field of Search ..340/224, 63, 64; 325/111, 117, 325/16; 343/225, 227

[56] References Cited

UNITED STATES PATENTS

| | | | |
|---|---|---|---|
| 3,371,278 | 2/1968 | Gelushia et al. | 325/16 X |
| 3,290,597 | 12/1966 | Denny et al. | 340/224 X |
| 3,461,423 | 8/1969 | Trumble | 340/63 X |
| 3,310,775 | 3/1967 | Birth | 340/63 |
| 3,387,259 | 6/1968 | Oliva | 340/64 |
| 3,242,460 | 3/1966 | Morrell | 340/63 X |
| 1,480,216 | 1/1924 | Mills | 343/227 X |
| 2,462,343 | 2/1949 | Wohlgemuth | 343/225 |

Primary Examiner—David L. Trafton
Attorney—Steinberg & Blake

[57] ABSTRACT

A remote alarm system for transmitting an alarm signal to a remote receiver when unauthorized access to a given installation is attempted. A remote portable radio transceiver is capable of receiving signals through the atmosphere from and transmitting signals through the atmosphere to a stationary radio transceiver which is operatively tuned to the remote transceiver for also receiving and transmitting signals from and to the remote transceiver. The stationary transceiver is located at the installation which is to be protected against unauthorized access, and a source of electrical energy is connected with the stationary transceiver. Connected to the installation as well as to the stationary transceiver is a switch for responding to an attempted unauthorized access so as to transmit a signal from the stationary transceiver to the remote transceiver. At the remote transceiver is an alarm which responds to the latter signal for warning the carrier of the remote transceiver that an attempted unauthorized access is being made at the installation.

12 Claims, 1 Drawing Figure

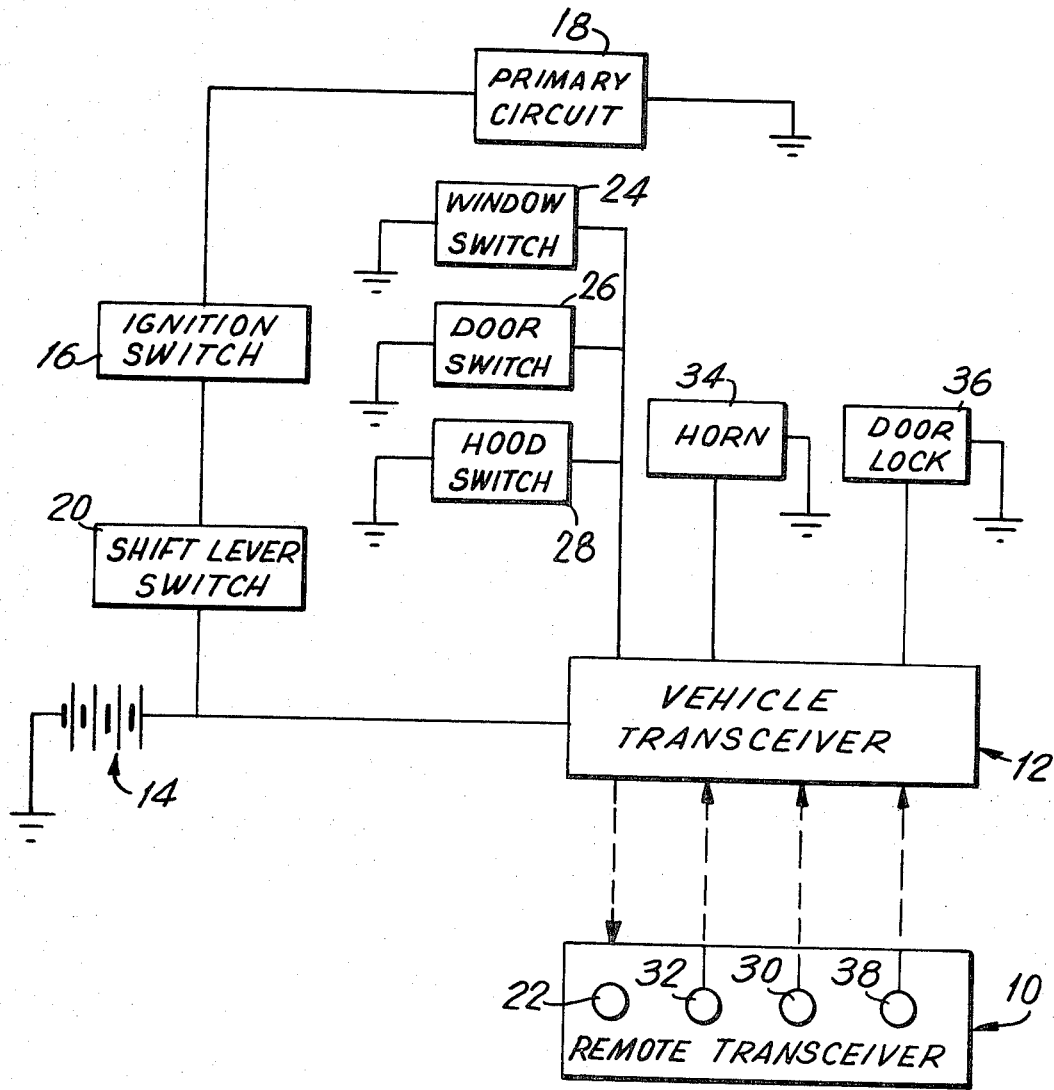

REMOTE ALARM SYSTEM

BACKGROUND OF THE INVENTION

The present invention relates to alarm systems.

Thus, the present invention relates to that type of alarm system which will give a warning when an attempt at unauthorized access is made at a given installation. For example in the case of a vehicle, if an attempt is made at theft of the vehicle an alarm will be given.

At the present time, it is customary to provide circuits which, for example, will sound the horn of the vehicle if an attempt at unauthorized access is made. Also, there are various preventive devices for preventing operation of the vehicle by an unauthorized individual.

However, the primary difficulty with all systems of this latter type is that they are localized at the installation which is to be protected against unauthorized access. The owner of the installation may be at a considerable distance therefrom and will be completely unaware of the fact that a theft or burglary is being attempted.

Moreover, the mechanisms of known access-preventing systems become well known in a relatively short time. Thus, it is common knowledge that the ignition switch of an automobile can be "jumped" so that the vehicle can be operated by an unauthorized individual. If a system was provided which automatically sounds a horn when an unauthorized individual breaks into a vehicle as by opening a door thereof, then of course the thief can immediately disconnect the horn so that it will no longer give the warning sound. Thus if a vehicle is situated at a sparsely populated location which is policed to a limited degree, the sounding of a horn will hardly act as a preventive, and the thief will have time to deactivate whatever preventive measures are taken to oppose theft of the vehicle.

SUMMARY OF THE INVENTION

It is accordingly a primary object of the present invention to provide a system for warning the owner of a given installation that an attempt at unauthorized access is under way even though the owner may be at a considerable distance from the particular installation, such as a vehicle.

Also, it is an object of the invention to combine this type or remote alarm system with measures for preventing operation of a vehicle by an unauthorized individual.

In addition it is an object of the invention to provide a remote alarm system which enables the owner of the installation to actuate from a remote location a warning such as a suitable sounding device so as to frighten a thief away.

Also, it is an object of the present invention to provide an alarm system which will enable an owner of a given installation to trap a thief under given conditions.

Furthermore, it is an object of the invention to provide a system which will respond to any one of a plurality of different types of attempts at unauthorized access in order to transmit a signal to the owner who is remote from the installation.

Thus, in accordance with the invention the remote alarm system includes a portable remote radio transceiver for transmitting and receiving electromagnetic wave signals propagated through the atmosphere. A stationary transceiver is adapted to be located at the installation which is to be protected against unauthorized access and is operatively tuned to receive from and to transmit to the remote radio transceiver electromagnetic wave signals propagated through the atmosphere. A source of electrical energy is operatively connected to the stationary transceiver. A means which responds to an attempt at unauthorized access to installations such as a vehicle is operatively connected to the stationary transceiver to actuate the latter to transmit a signal to the remote transceiver, and at the latter is a means for giving an alarm upon receiving the latter signal. Moreover, the remote transceiver has in addition to a means for activating and deactivating the stationary transceiver a means for transmitting to the stationary transceiver a signal which will activate a unit such as a horn, door lock or the like, which is operatively connected to the stationary transceiver to be activated when the latter receives the signal from the remote transceiver.

BRIEF DESCRIPTION OF DRAWING

The invention is illustrated by way of example in the accompanying drawing which schematically represents a system according to the invention as applied to a vehicle such as an automobile.

DESCRIPTION OF PREFERRED EMBODIMENTS

Although the description presented below refers specifically to a vehicle such as an automobile, it is to be understood that the invention is generally applicable to other installations. For example, the invention may be used in connection with a safe to give a signal when a door of the safe is opened. It may be also used in connection with a home so as to give a signal when a door or window of the home is opened. Thus, the invention can generally be used with any installation which is to be protected against unauthorized access.

In a particular example shown in the drawings, the system of the invention includes a portable remote transceiver 10 for transmitting and receiving electromagnetic wave signals propagated through the atmosphere. A vehicle-mounted radio transceiver 12 is operatively tuned to receive from and to transmit to the remote transceiver 10 electromagnetic wave signals propagated through the atmosphere. Thus, the transceiver 12 forms a stationary transceiver which in the case of a safe, home, or the like, will be connected to the particular installation which is to protected, in this case a vehicle. Thus, the term "stationary" 25 applied to a vehicle transceiver signifies that the transceiver is stationary with respect to the vehicle. The transceivers 10 and 12 are of the same type, and may have the form of a combined transmitter and transceiver of the type commonly used to control model airplanes, ships, cars, and the like.

A source of electrical energy is operatively connected to the stationary transceiver 12, and in this case the source takes the form of a battery 14. This battery 14 in the case of a vehicle will be connected through the ignition switch 16 to the primary circuit 18 of the vehicle. Thus, in a conventional manner when the ignition switch 16 is closed the primary circuit is in a condition to render the vehicle operative.

In accordance with one of the features of the invention a shift lever switch means 20 is connected in series between the ignition switch 16 and the source 14. This shift lever switch means 20 responds to movement of the shift lever of the vehicle from the neutral or parked position to any drive position or to the reverse position for assuming an open position even if the ignition switch has been "jumped," so that under these conditions if a thief should attempt to drive the vehicle away, as soon as the shift lever is moved out of the neutral or parked position the vehicle cannot be operated. The switch 20 can be actuated by the operator of the vehicle when the key is placed in the ignition switch 16 to maintain a closed position deactivating the operation of the switch 20 during normal vehicle operation by an authorized individual.

It is to be understood that this shift lever switch means 20 is but one of many different types of structures available for preventing unauthorized operation of a vehicle. Thus, even if a thief should have access to the vehicle in an unauthorized manner the shift lever switch means 20 will function, assuming that it has been preset by the operator upon leaving the vehicle, to deter unauthorized operation of the vehicle.

Operatively connected to the stationary transceiver 12 is a means which will respond to an attempted unauthorized access for transmitting a signal from the transceiver 12 to the transceiver 10. Thus, in the case of a vehicle there is a window switch at each window which will respond to opening of the window, a door switch at each door which will respond to opening of a door, and a hood switch at the hood which will respond to opening of the hood. When any one of these switches closes in response to opening of a door, opening of a window, or opening of the hood, the transceiver 12 is activated to transmit a signal to the remote transceiver 10 which has a warning means 22 in the form of a lamp which becomes illuminated, a sounding device which can give intermittent beeps or the like, so that the individual who carries the transceiver 10, which may be no greater than a pocket transistor radio, for example, will receive a signal that an attempt at unauthorized access is being made. Thus, if at the vehicle a window switch 24 is closed upon an unauthorized attempted opening of a window, or if a door switch 26 is closed when there is an unauthorized attempt at opening the door, or if the hood is opened to close a switch 28, then either one or all of these latter means will automatically activate the stationary transceiver 12 to transmit a signal therefrom to the remote transceiver 10 for energizing the alarm means 22 thereof.

In addition the remote transceiver 10 has an activating and deactivating switch 30 capable of being operated for transmitting to the stationary transceiver 12 a signal which will render the transceiver 12 operative or which will deactivate the transceiver 12. Thus, once the owner of the particular installation leaves the latter and wishes to have the alarm system operate he need only actuate the switch 30 so as to activate the transceiver 12.

It is possible to construct the stationary transceiver 12 so that all of the lead in and outlet connections are built into a single multipronged plug enabling the transceiver 12 to be plugged into such a unit. If desired a multiwire, pigtail type connection can be connected to the unit. In any event, the transceiver 12 is readily removable for repairs and can be located at any installation which is easily designed to receive the stationary transceiver 12.

The remote transceiver 10 has a switch 32 which may be actuated by the operator for transmitting a signal to the stationary transceiver 12. In this case the signal will activate a horn 34. For example, the transceiver 12 can respond to a signal upon operation of the switch 32 for closing a switch to the horn 34 so that the latter will give an audible alarm.

If desired, the vehicle or other installations such as a safe or a home can be provided with electromagnetic door locks, schematically represented by the unit 36 which is electrically connected with the transceiver 12 to be actuated thereby upon receiving a suitable signal from the remote transceiver 10. In this case the operator can actuate a switch 38 for transmitting a signal to the transceiver 12 in order to cause the electromagnetic door locks 36 to become energized, thus preventing opening of the doors.

The above-described system of the invention can be used in a number of different ways. For example, depending upon the particular conditions the individual who carries the portable transceiver 10 may simply wish to receive an alarm by receiving at the alarm unit 22 a signal in response to actuation of any one or more of the units formed by the window switch 24, the door switch 26, or the hood switch 28. For example, if the vehicle happens to be parked in a location which in densely populated with a considerable amount of traffic and a considerable amount of police in the area, the individual carrying the remote transceiver 10 may decide that the best course to follow is not to frighten the thief away by actuating the horn 34 but rather to immediately telephone the police who will in an extremely short time reach the vehicle to apprehend the thief.

It is to be noted in this connection that the presence of a device such as the shift lever switch means 20 will delay the possibility of a rapid driving away of the vehicle so that the time during which the thief remains at the vehicle will be increased thus enhancing the opportunity for apprehension of the thief.

On the other hand, if the vehicle happens to be parked out in a relatively desolate area in the country where there is only a low density of population and a small degree of policing, the individual carrying the remote transceiver 10 may decide that the best course to follow upon receiving a signal at the alarm 22 is to attempt to frighten the thief away, and in this case the switch 32 can be manipulated for sending to the stationary transceiver 12 a signal for actuating the horn 34. At the same time the police can be notified of the attempted theft and the sounding of the horn 34 will further delay the thief if he attempts to deactivate the horn, so that the combination of the unit 34 together with the unit 20 will cause the thief to remain at the vehicle for a considerable amount of time. Thus, under conditions where the vehicle is situated at a location where a substantial time is required for the police to reach the scene, these devices 34 and 20 can be used to increase the chances of capturing the thief.

As a further attempt to retain the thief at the vehicle to enhance the possibility of capture, it is possible for the individual carrying the remote transceiver 10 to manipulate the switch 38 so as to send to the stationary transceiver 12 a signal which will energize the electromagnetic door locks 36 for closing a thief within the vehicle and preventing his departure from the vehicle. If desired, the system may be modified so that the hood switch can be separately connected to the stationary transceiver 12 for sending an independent signal to an independent alarm 22 which notifies the individual carrying the remote transceiver 10 that the hood has been opened. Since the hood has been opened, rather than the door, the chances are that a considerable time will elapse before the thief can drive the vehicle away, so that under these conditions the operator may decide that it is best to simply notify the police, not to activate the horn 34 or the door locks 36.

Moreover, it is clear that the stationary transceiver 12 may be located in a home where the door locks 36 are connected to doors of the home while the window switch 24 is connected to each of the windows of the home. The door switch 26 can in this case be connected either to the doors of the home or simply to a door of a safe within the home.

Of course, the system of the invention can be applied to any container which has a door which must be opened to give access to valuables within the container, so that the opening of the door will transmit a signal to the alarm indicator 22 so that the carrier of the remote transceiver can take suitable steps. Any home can be provided with an electrically operated horn 34 to be sounded for frightening a thief away in the event that it is felt that too much time will be required for the police to arrive at the scene.

The alarm indicator 22 may be of the type which gives audible beeps in the event that it is intended to carry it about in a pocket. On the other hand, a lamp may be illuminated to form the indicator 22 in the event that the remote transceiver 10 is to be placed on a table or the like in easy viewing range of the individual who carries the transceiver 10. Also, a pair of alarms forming an alarm indicator 22 may be provided, one audible and one visual, to be selectively rendered operative depending upon whether the transceiver 10 is placed within viewing range or whether it is intended to receive an audible signal. Naturally, both of these types of signals can be simultaneously provided, if desired.

Thus, it will be seen that with the system of the invention relatively inexpensive freely available units are capable of being assembled to provide an alarm system according to which the owner of a given installation can be warned when at a considerable distance from the installation of the fact that an attempt at unauthorized entry is under way. Furthermore, with the structure of the invention it is possible to take steps in addition to simply notifying the police such as sounding the horn 34 or actuating the locks 36, so that positive steps at prevention of unauthorized access can be taken.

While the carrier of the remote transceiver 10 is still in the vicinity of the installation where the stationary transceiver is located, it is possible to check the operation. Thus, with the switch 30 manipulated to activate the stationary transceiver 12 it is possible to open a door so as to determine whether a signal with activate the alarm 22. In this way the operator will know that the device is operative.

Of course, when the authorized individual returns to the installation he will deactivate the transceiver 12 by manipulation of the switch 30, and of course the shift lever switch 20 will also be deactivated so that normal operation of the vehicle can be carried out.

It is furthermore possible to arrange the transceivers 12 and 10 in such a way that the structure is simplified and rendered even more reliable. Thus, the switch 30 may be used to activate the transceiver 12 after the doors of the vehicle have been locked. While the operator is still in relatively close proximity to the vehicle he will manipulate the switch 30 for activating the transceiver 12, and at the same time the latter when activated may send a confirming signal to the transceiver 10, causing through an independent circuit with a suitable timer a five-second beep to take place, after which the latter signal automatically terminates without influencing the other circuitry. In this way the operator will know that the system is fully functional and operating properly.

When the driver returns to the vehicle, he will again hold the portable transceiver 10 in the vicinity of the vehicle while spaced therefrom, and now he will manipulate the switch 30 so as to deactivate the transceiver 12, and at this time also a confirming signal such as a five-second beep can be transmitted to a circuit having a suitable timer and in no way influencing the other circuitry so that the operator will know that the system has been deactivated. Now the driver can enter the vehicle in the normal manner and will turn the transceiver 12 to the off position as well as deactivate the shift lever switch 20.

Moreover, instead of providing for the remote transceiver switches 32 and 38 for bringing about selected operations in response to signals transmitted from the remote transceiver 10 to the stationary transceiver 12, the latter stationary transceiver 12 may initially be preset to automatically sound the horn or lock the doors when there is an unauthorized entry into the vehicle. This will of course simplify the construction of the remote transceiver 10 and the operator can judge the nature of the situation before leaving the vehicle so as to determine which of the settings of the transceiver 12 will be most appropriate. Thus, under these conditions all that the transceiver 12 is required to do is transmit a signal to the remote transceiver 10 to give an alarm, and in this case the remote transceiver 10 need only be provided with the switch 30.

A further simplification can be achieved by elimination of the switch 30 as well as the switches 32 and 38. Thus, if it is considered satisfactory to eliminate the signal according to which the operator while spaced from the vehicle can check as to the operational condition of the system, then it is only required for the stationary transceiver 12 to transmit the alarm signal to the portable or remote transceiver 10. The latter transceiver is not required to transmit any signal to the stationary transceiver 12. In this case the stationary transceiver would simply be set so as to become active when the operator closes the vehicle doors and leaves the vehicle. The transceiver 12 would still be set so as to sound the horn, lock the doors, etc., according to the conditions, although it could also be set simply to transmit an alarm to the portable transceiver 10, allowing the operator to notify the police while the thief remains at the vehicle. Thus, this is a further simplification which will further reduce the costs involved, but of course it is at the sacrifice of remote activation and deactivation of the system as well as remote checking as to the operational condition of the system.

Furthermore, the switches 32 and 38 may be used to preset the transceiver 12 after the vehicle is closed while the operator is still close to the vehicle. In other words, instead of presetting transceiver 12 before closing the vehicle, suitable circuitry can be provided to enable the operator immediately upon leaving the vehicle to select either an operation activating the horn automatically when an attempt at unauthorized entry is made or activating the door locks under these conditions. The advantage of this arrangement is that the stationary transceiver can take substantially the form of a completely closed box preventing any tampering so that the remote setting of the stationary transceiver will assure that the selected setting of the latter cannot be changed by an intruder.

Furthermore, the testing of the system for operativeness by activation with a five second signal as pointed out above is preferably supplemented by a second independent circuit in the remote transceiver which responds to an alarm signal from the stationary transceiver for setting the alarm at the remote transceiver into operation with the latter having a circuitry in the nature of a holding relay which will maintain the alarm in operation in the remote transceiver irrespective of what happens at the stationary transceiver until the possessor of the remote transceiver chooses to turn the alarm off.

What is claimed is:

1. In a remote alarm system, a portable remote radio transceiver for transmitting and receiving electromagnetic wave signals propagated through the atmosphere, said remote transceiver being small enough to be carried about on one's person, a stationary radio transceiver operatively tuned to receive from and to transmit to said remote radio transceiver electromagnetic wave signals propagated through the atmosphere, said stationary transceiver being situated at an installation which is to be protected against unauthorized access, a source of electrical energy operatively connected to said stationary transceiver, means at said remote transceiver for activating and deactivating said stationary transceiver, means operatively connected to said stationary transceiver and to said installation for responding to an attempt at unauthorized access to said installation to transmit a signal from said stationary transceiver to said remote transceiver, and means at said remote transceiver for giving an alarm when said remote transceiver receives said signal.

2. The combination of claim 1 and wherein said remote transceiver includes a means for transmitting a signal to said stationary transceiver, and means at said stationary transceiver for responding to the latter signal for sounding an audible alarm.

3. The combination of claim 1 and wherein said installation includes doors capable of being locked, means at said remote transceiver for transmitting a signal to said stationary transceiver, and means operatively connected to said stationary transceiver and locks of said doors for automatically actuating said locks to prevent opening of said doors when said stationary transceiver receives said signal from said remote transceiver.

4. The combination of claim 1 and wherein said installation is a vehicle, a primary circuit, an ignition switch, and a shift lever switch means connected in series with each other and all connected to said source, said shift lever switch means preventing flow of current from said source to said primary circuit when a shift lever is moved from a neutral or park position to any drive position or to a reverse position.

5. The combination of claim 1 and wherein said means responding to attempted access to said installation is a door switch which transmits the signal from said stationary to said remote transceiver upon opening of a door.

6. The combination of claim 1 and wherein said means responding to attempted access is a window switch actuating said stationary transceiver to transmit a signal to said remote transceiver upon opening of a window.

7. The combination of claim 1 and wherein said installation is a vehicle having a hood, and said means responding to unauthorized access is a hood switch actuating said stationary transceiver to transmit a signal to said remote transceiver upon opening of a hood.

8. The combination of claim 1 and wherein installation is a vehicle having a horn operatively connected to said stationary transceiver and means at said remote transceiver for transmitting to said stationary transceiver a signal for actuating said horn.

9. The combination of claim 1 and wherein said installation is a vehicle having windows, doors, and a hood, said means responding to unauthorized access including a window switch, a door switch, and a hood switch all connected in parallel to said stationary transceiver for transmitting a signal therefrom to said remote transceiver when the hood, a door, or a window of the vehicle are opened.

10. The combination of claim 9 and wherein the vehicle has a horn operatively connected to said stationary transceiver to be actuated thereby, and means at said remote transceiver for transmitting a signal to said stationary transceiver for actuating said horn.

11. The combination of claim 9 and wherein the vehicle has a door lock means operatively connected to said stationary transceiver to be actuated thereby for locking the doors, and means at said remote transceiver for transmitting to said stationary transceiver a signal for actuating the door lock means to lock the doors.

12. In a remote alarm system, a portable remote radio transceiver for receiving electromagnetic wave signals propagated through the atmosphere, said remote transceiver being small enough to be carried about on one's person, a stationary radio transceiver operatively tuned to transmit to said remote radio transceiver electromagnetic wave signals propagated through the atmosphere, said stationary transceiver being situated at an installation which is to be protected against unauthorized access, a source of electrical energy operatively connected to said stationary transceiver, means operatively connected to said stationary transceiver and to said installation for responding to an attempt at unauthorized access to said installation to transmit a signal from said stationary transceiver to said remote transceiver, and means at said remote transceiver for giving an alarm when said remote transceiver receives said signal, said remote transceiver having a means for activating said stationary transceiver while said remote transceiver is spaced from the installation and for also providing, while the remote transceiver is spaced from the installation, a selective setting of said stationary transceiver to initiate at the installation an operation such as sounding of an alarm, locking of doors or the like.

* * * * *